Oct. 3, 1950     H. J. MATTESON     2,524,569
ORIFICE CARTRIDGE
Filed Dec. 17, 1946
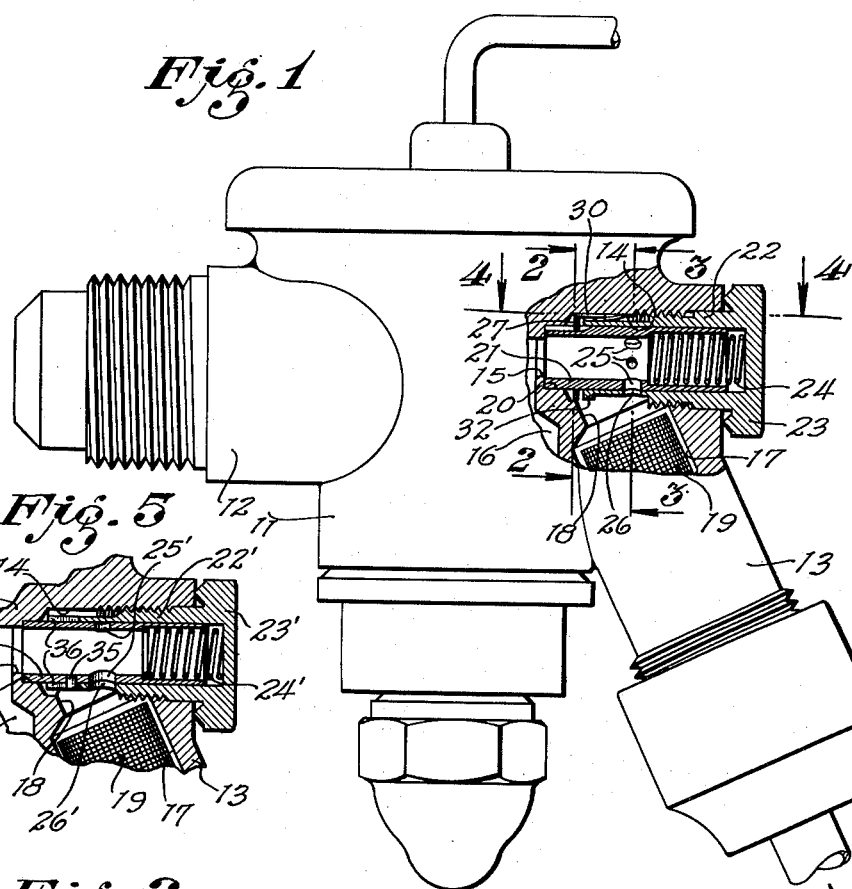
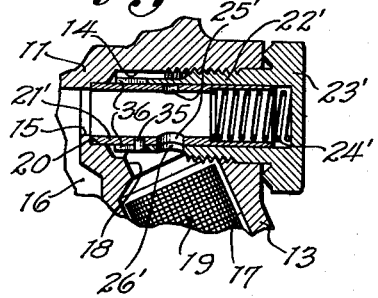
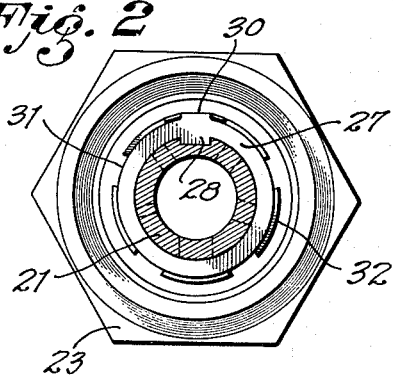
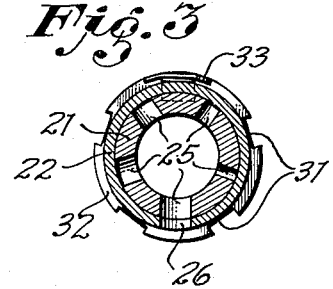
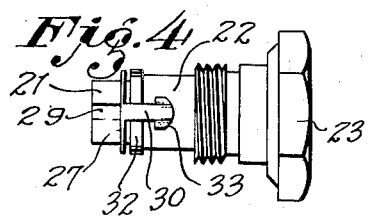
INVENTOR,
HAROLD J. MATTESON
By
John H. Rouse,
ATTORNEY.

Patented Oct. 3, 1950

2,524,569

UNITED STATES PATENT OFFICE 2,524,569

ORIFICE CARTRIDGE

Harold J. Matteson, Glendale, Calif., assignor to General Controls Co., Glendale, Calif., a corporation of California Application December 17, 1946, Serial No. 716,683

3 Claims. (Cl. 138—46)

This invention relates to means for determining the flow capacity of valves, in particular, those of the thermal-expansion type employed in refrigerating systems. In such systems it is necessary that the valve be exactly "sized" to meet the particular conditions of operation and the valve is therefore usually provided with a fitting, having an orifice controlling flow through the valve, which may be removed and replaced by another having an orifice of suitable size if it is desired to change the flow capacity of the valve. This necessitates maintenance by the installer of a relatively large supply of extra orifice fittings, some of which may never be used, and the production by the manufacturer of many additional parts.

It is therefore an object of this invention to avoid such waste and the possibility of failure of the installer to have the proper orifice-fitting on hand when needed; this object being accomplished by the provision of a readily removable-and-replaceable orifice-fitting or -cartridge whose flow capacity can be varied over a wide range by the installer.

For full understanding of the invention, and further appreciation of its features and advantages, reference is to be had to the following detailed description and accompanying drawing, and to the appended claims.

In the drawing:

Figure 1 is a front elevation of a thermal-expansion valve; a portion of the body of the valve being broken away to show, in longitudinal section, an orifice-cartridge embodying the invention;

Figures 2 and 3 are enlarged transverse sections through the cartridge taken, respectively, along the lines 2—2 and 3—3 of Fig. 1;

Figure 4 is a plan of the cartridge as viewed from the plane 4—4 of Fig. 1; and

Figure 5 is a fragmentary sectional view showing a modified form of orifice-cartridge.

The thermal-expansion valve shown in Fig. 1 (and, fragmentarily, in Fig. 5) may be similar in construction to that shown in my Patent No. 2,327,542, issued August 24, 1943, and comprises a body 11 having an inclined inlet projection 12 and a horizontal outlet projection 13. Leading from the exterior of the valve body is a bore 14 having a reduced inward extension 15 which communicates with a valve chamber 16. The inlet passage 17 of the valve is connected by a reduced extension 18 to the bore 14, there being in the passage 17 the usual strainer 19.

Between the bore 14 and its extension 15 is a shallow circular recess 20 which forms a seat or socket for one end of a hollow cylindrical member 21 which fits within the hollow of another generally-cylindrical member 22 threaded in the outer portion of bore 14. The outer end of member 22 is closed by a head 23 which is formed to sealingly engage the outer surface of the valve body. A spring 24, compressed between the closed end of member 22 and a shoulder formed within the member 21, serves to maintain member 21 seated.

Referring first more particularly to the embodiment of the invention shown in Figs. 1–4, there is in the side wall of member 21 a circumferential row of orifices 25, of respectively different size, which are individually cooperable with an aperture 26 in the side wall of member 22, the size of the aperture being the same as that of the largest of the orifices. With the parts in the positions shown in these figures, the flow capacity of the cartridge constituted by members 21 and 22 is determined by the size of the lowermost one of the orifices 25 which is in register with aperture 26, and the flow capacity of the valve is determined by that of the cartridge since the only path of fluid communication between the bore 14 and its extension 15 is by way of aperture 26, the lowermost orifice 25, the interior of member 21, and the open left-hand end of the same.

As is best seen in Figs. 2 and 4, rotation of the members 21 and 22 relative to each other is prevented by a ring 27 having a spline 28, fitting a longitudinal slot 29 in the outer surface of member 21, and a resilient finger 30 which cooperates with notches 31 formed in a narrow circumferential enlargement 32 of the left-hand end of member 22. The finger 30 has at its tip a catch 33 which prevents accidental separation of the members when the cartridge is removed from the valve body; the catch being so arranged that it permits sufficient longitudinal movement of member 21 to ensure proper seating of the same in recess 20 under the force of spring 24 when the cartridge is installed.

To change the flow capacity of the cartridge it is unscrewed from the valve and, while flexing the finger 30 outwardly, the member 21 is rotated to bring the selected one of orifices 25 into communication with aperture 26.

The simplified form of orifice cartridge shown in Fig. 5 differs from that described above only in the means for preventing relative rotation of the telescoped members, and in the fact that there are only two flow-restricting orifices in the embodiment illustrated; accordingly, the cartridge-parts in Fig. 5 which correspond to those of Figs. 1-4 have been assigned the same reference numerals with a prime mark added. Extending from the side wall of member 21' is a pin 35 which cooperates, selectively, with diametrically-opposed slots 36 cut in the end portion of member 22', so that by removing the cartridge from the valve body and partially withdrawing member 21' the same can be rotated through 180° to place the other of the orifices 25' in communication with aperture 26'. If it is desired to increase the range of the cartridge, additional orifices (and corresponding pin-slots) may be provided.

The specific embodiments of my invention herein shown and described are obviously susceptible of modification without departing from the spirit of the invention, and I intend therefore to be limited only by the scope of the appended claims.

I claim as my invention:

1. An orifice cartridge for restricting flow through a valve-passage, comprising a pair of elongated hollow cylindrical members arranged in telescoped relation, said cartridge being adapted to be connected to an end of said passage by an end of one of said members with the remainder of the cartridge outside of the passage, said end of said one of the members having a relatively large opening for establishing free communication between said passage and the interior of the cartridge, one of said members having in its side wall a plurality of orifices of respectively different size, the other of said members having in its side wall an aperture whose flow-capacity is at least equal to that of the larger of said orifices, said members being movable relative to each other to place a selected one of said orifices in communication with said aperture, the outer end of one of said members being closed so that flow through the cartridge is determined by the selected one of said orifices.

2. An orifice cartridge, as defined in claim 1, wherein said members are rotatable relative to each other between several positions to place said orifices individually in communication with said aperture, and including means for maintaining the members in said positions.

3. An orifice cartridge, as defined in claim 1, wherein said members are rotatable relative to each other between several positions to place said orifices individually in communication with said aperture, as well as longitudinally relative to each other; the cartridge including means for maintaining the members in said positions, as well as spring means urging the members out of telescoped relation.

HAROLD J. MATTESON.

REFERENCES CITED

The following references are of record in the file of this patent:

UNITED STATES PATENTS

| Number | Name | Date |
|---|---|---|
| 1,513,645 | Smith | Oct. 28, 1924 |
| 1,974,975 | Stein et al. | Sept. 25, 1934 |
| 2,327,542 | Matteson | Aug. 24, 1943 |

FOREIGN PATENTS

| Number | Country | Date |
|---|---|---|
| 431,838 | Germany | July 17, 1926 |